United States Patent
Bostrom et al.

[11] Patent Number: 5,871,198
[45] Date of Patent: Feb. 16, 1999

[54] LOW PROFILE SEAT SUSPENSION

[75] Inventors: John M. Bostrom, Waterford; Douglas P. Gennrich, Cudahy, both of Wis.; Charles A. Van Breemen, Glen Ellyn, Ill.

[73] Assignee: H. O. Bostrom Company, Inc., Waukesha, Wis.

[21] Appl. No.: 950,346

[22] Filed: Oct. 14, 1997

Related U.S. Application Data

[62] Division of Ser. No. 691,259, Aug. 2, 1996, Pat. No. 5,765,802.

[51] Int. Cl.⁶ .............................. B60N 2/02; F16M 13/00
[52] U.S. Cl. ......................... 248/588; 248/575; 267/172; 267/177; 297/344.1
[58] Field of Search ..................................... 248/419, 421, 248/564, 588, 624, 575; 267/172, 177, 179

[56] References Cited

U.S. PATENT DOCUMENTS

| | | |
|---|---|---|
| 2,365,468 | 12/1944 | Herold . |
| 2,460,596 | 2/1949 | Roche . |
| 3,572,219 | 3/1971 | Murrell et al. ................... 267/172 X |
| 3,633,864 | 1/1972 | Miller ....................................... 248/419 |
| 3,645,488 | 2/1972 | Sturhan . |
| 3,679,166 | 7/1972 | Sturhan . |
| 3,826,457 | 7/1974 | Hout de Longchamp . |
| 3,874,626 | 4/1975 | Gross et al. . |
| 4,125,242 | 11/1978 | Meiller et al. ....................... 248/421 X |
| 4,350,317 | 9/1982 | Aondetto . |
| 4,384,701 | 5/1983 | Barley . |
| 4,613,119 | 9/1986 | Hardtke ................... 267/172 |
| 4,659,052 | 4/1987 | Nagata ................... 267/177 X |
| 4,856,763 | 8/1989 | Brodersen et al. . |
| 4,926,760 | 5/1990 | Sack ................... 248/588 X |
| 5,116,016 | 5/1992 | Nagata ................... 267/177 X |
| 5,222,709 | 6/1993 | Culley, Jr. et al. . |
| 5,251,864 | 10/1993 | Itou . |

FOREIGN PATENT DOCUMENTS

| | | |
|---|---|---|
| 0 049 167 | 10/1980 | European Pat. Off. . |
| 2 357 397 | 7/1976 | France . |
| 2 447 829 | 2/1979 | France . |
| 2707184 | 8/1978 | Germany ................... 248/588 |
| 804945 | 2/1981 | U.S.S.R. ................... 267/172 |
| 2 064 317 | 11/1979 | United Kingdom . |

*Primary Examiner*—Peter M. Cuomo
*Assistant Examiner*—David E. Allred
*Attorney, Agent, or Firm*—Andrus, Sceales, Starke & Sawall

[57] ABSTRACT

A vehicle seat suspension includes a bottom frame adapted to be mounted on the vehicle and a top frame located above the bottom frame and adapted to support a seat thereon. A substantially fully collapsible scissors linkage is interconnected between the bottom frame and the top frame enabling the bottom frame and the top frame to move relative to each other substantially in parallelism. A biasing arrangement is disposed between the top frame and the bottom frame and has a preload force urging the top frame away from the bottom frame. A first adjustment mechanism is located in the top frame and selectively enables fore and aft adjustment of the top frame relative to the bottom frame. A second adjustment mechanism is located between the bottom frame and the top frame and selectively enables an adjustment on the biasing arrangement in accordance with the weight of an occupant in the seat by translating a horizontal force applied along the bottom frame into a vertical force affecting the preload force of the biasing arrangement.

7 Claims, 6 Drawing Sheets

FIG. 2

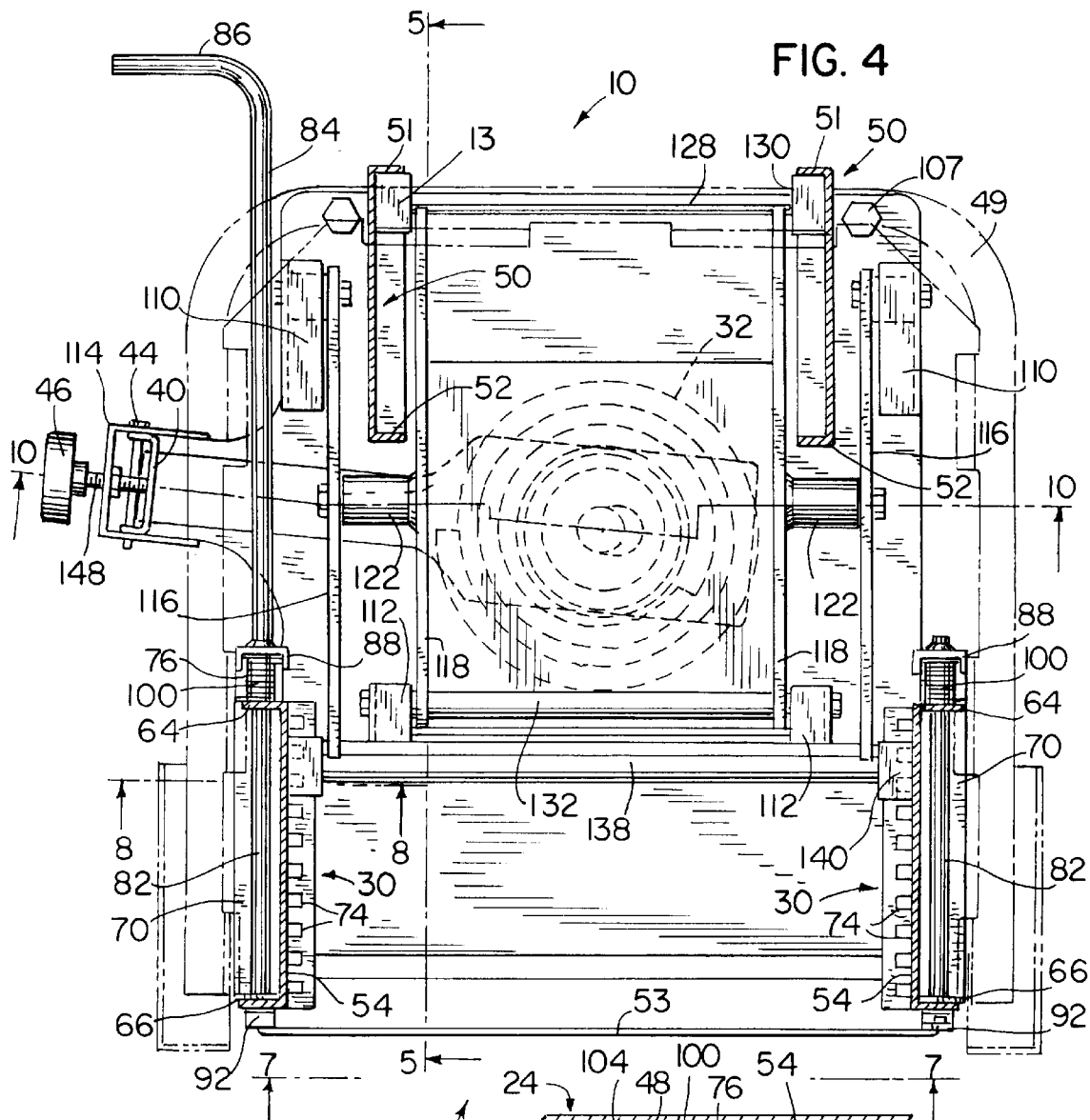
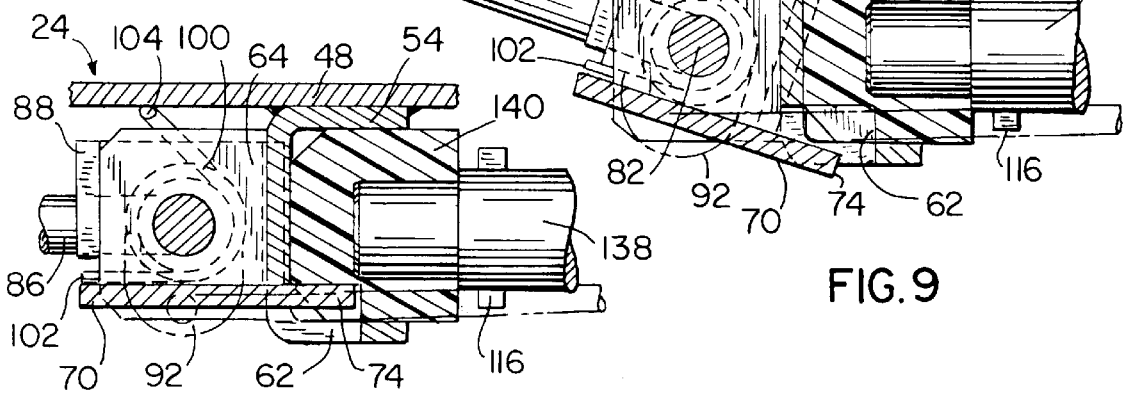

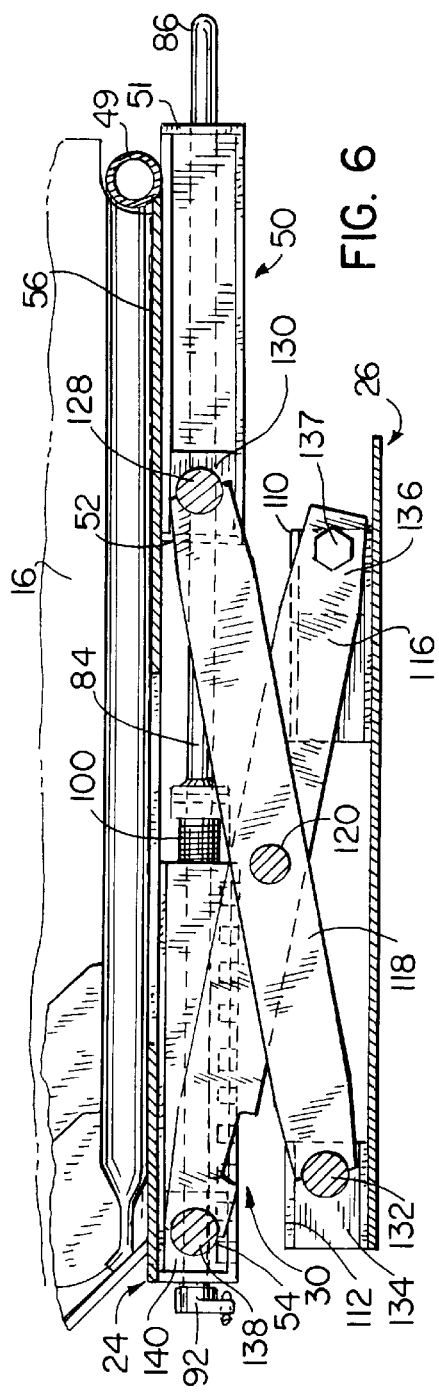
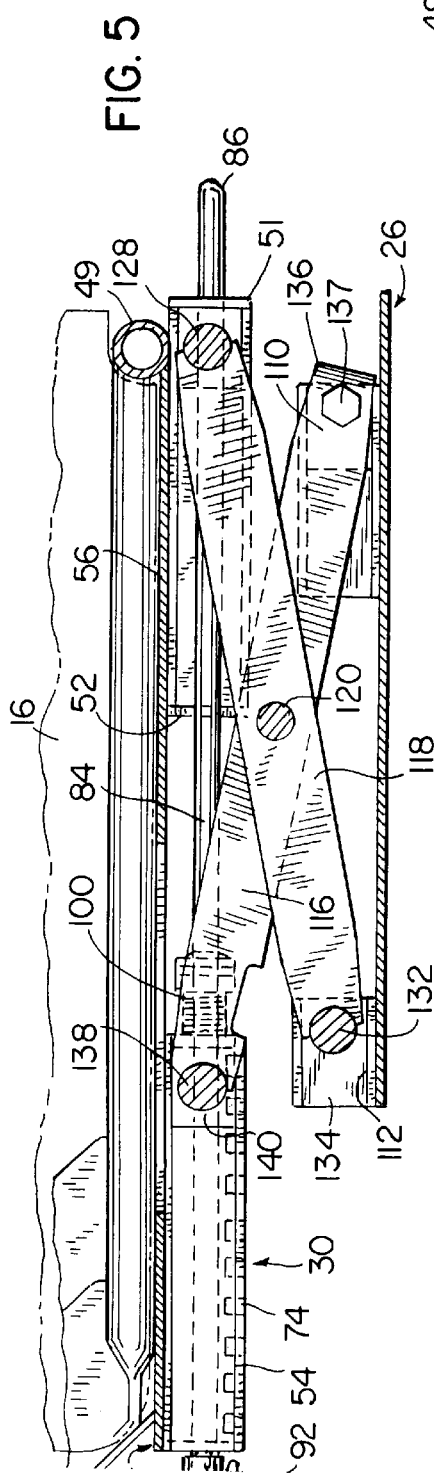
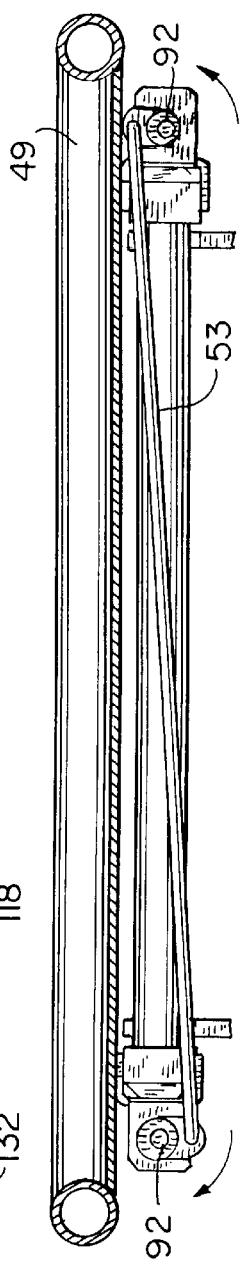
FIG. 6
FIG. 5
FIG. 7

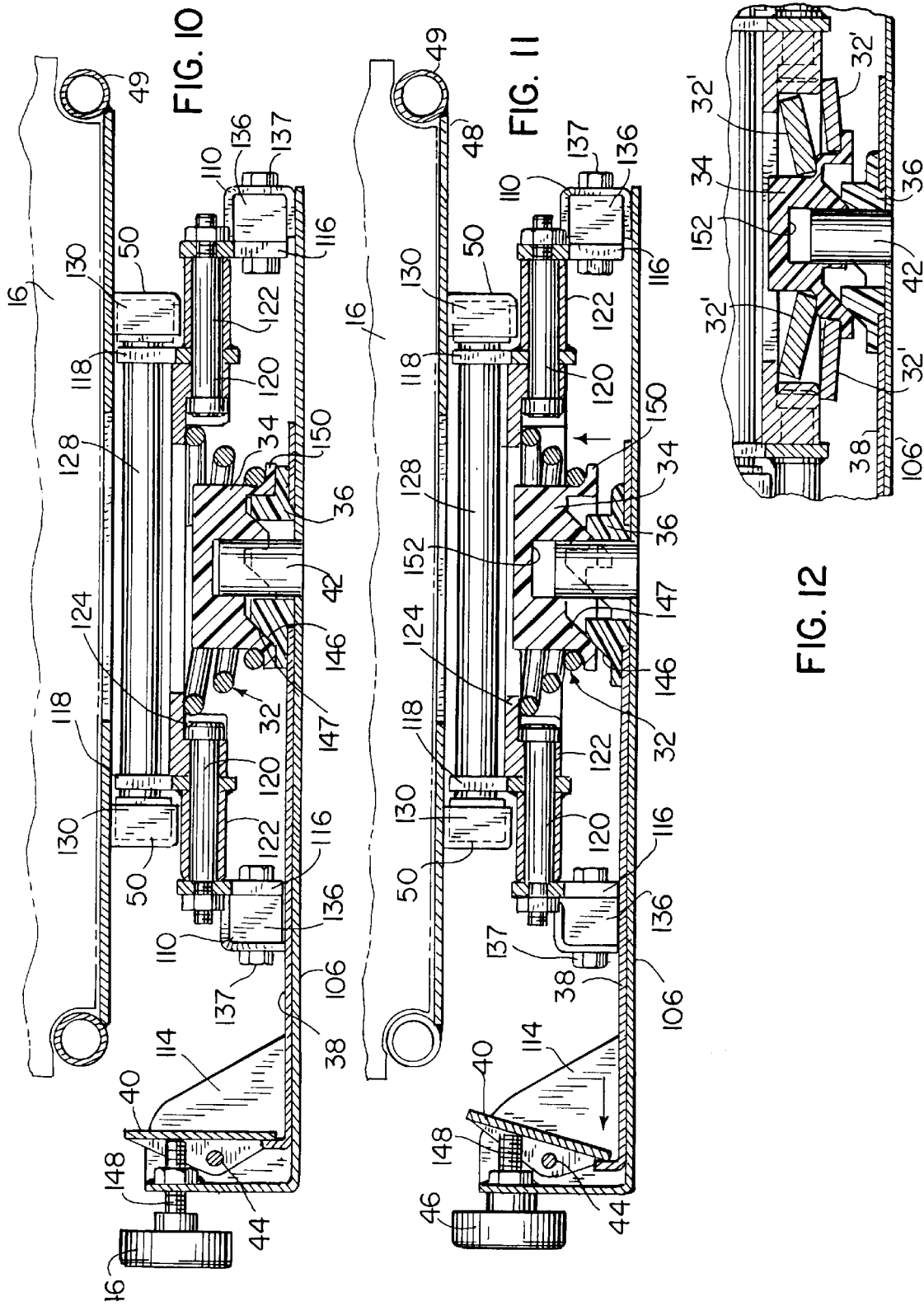

LOW PROFILE SEAT SUSPENSION

This is a division of application Ser. No. 08/691,259, filed Aug. 2, 1996, now U.S. Pat. No. 5,765,802.

FIELD OF THE INVENTION

This invention relates broadly to a vehicle seat suspension assembly and, more particularly, pertains to a fore and aft seat adjustment mechanism and a seat occupant weight compensation adjustment which collectively provide a vehicle seat suspension having a relatively low profile.

BACKGROUND AND SUMMARY OF THE INVENTION

As is well known, vehicles, and in particular large trucks, are provided with scissors-type suspensions capable of cushioning extremely heavy loads unlike those normally encountered in the smoother ride of a passenger car. In order to isolate the driver from fatigue and discomfort induced by the vehicle vibrations, it is normal practice to provide seat suspension systems incorporating various spring arrangements which protect the driver from vibrations at the expense of consuming a considerable amount of physical space beneath the seat. This is especially applicable to spring suspension systems which can be adjusted according to the weight of the seat occupant. Some of these seats include slide provisions which enable a fore and aft or longitudinal adjustment of the seat relative to the floor of the vehicle. When a seat is provided with both of the aforementioned adjustments, it must locate its seat frame a considerable distance above the vehicle floor to accommodate them. In addition, the partial collapsibility of the scissors linkage used in these suspensions also contributes to the distance at which the seat is mounted. Often, this distance becomes prohibitively high to be utilized in certain vehicles having relatively small space limitations between the floor and the ceiling. Accordingly, it remains desirable to provide a seat suspension incorporating both a seat occupant weight compensation adjustment and a fore and aft seat adjustment which together with a substantially fully collapsible scissors linkage will ensure a relatively low profile for the seat.

It is a principal object of the invention to provide a suspension mechanism that is simply constructed and relatively inexpensive while still meeting manufacturers' ever increasing demands for compactness and comfort.

It is also an object of the invention to provide a suitable suspension unit which will reduce the shocks and vibration transmitted from the vehicle to a driver via the driver's seat.

It is a further object of the invention to provide a seat suspension having an adjustable preload to suit the weight of the seat occupant.

It is another object of the invention to provide a seat suspension utilizing a scissors linkage having slide channels which serve as guides for the longitudinal adjustment of the seat.

It is another object of the invention to provide a seat suspension having a substantially full collapsible scissors linkage.

It is yet another object of the invention to provide a seat suspension employing different types of springs.

Still another object of the invention is to provide a more comfortable ride throughout the operational range of the seat suspension.

The present invention advantageously provides a vehicle seat suspension employing a force storage compression spring assembly whose initial force is adjustable by selectively shifting the height of a camming mechanism. The seat suspension also relies on a fore and aft adjustment strategically confined in the existing frame supporting the seat.

In one aspect of the invention, a low profile vehicle seat suspension comprises a bottom frame adapted to be mounted on the vehicle and a top frame located above the bottom frame and adapted to support a seat thereon. A scissors linkage is interconnected between the bottom frame and the top frame and enables the bottom frame and the top frame to move relative to each other substantially in parallelism. A biasing arrangement is disposed between the top frame and the bottom frame and has a preload force urging the top frame away from the bottom frame. A first adjustment mechanism is located in the top frame and selectively enables fore and aft adjustment of the top frame relative to the bottom frame. A second adjustment mechanism is located between the bottom frame and the top frame and selectively enables an adjustment on the biasing arrangement in accordance with the weight of an occupant in the seat by translating a horizontal force applied along the bottom frame into a vertical force affecting the preload force of the biasing arrangement.

In another aspect of the invention, an adjustable vehicle seat comprises a bottom frame adapted to be mounted on the vehicle, and a top frame located above the bottom frame and adapted to support a seat thereon. A scissors linkage having a spring support interconnects the bottom frame and the top frame and constrains the top frame to vertical movement relative to the bottom frame. A spindle extends upwardly from the bottom frame and an adjustment plate is slidably disposed on the bottom frame, the adjustment plate having a opening formed by a continuous wall through which the spindle projects in spaced relationship to the wall. A cam is fixed to the adjustment plate and encircles the spindle in spaced relationship therewith. A cam follower having an outwardly extending lip is movably mounted upon the cam and encircles the spindle. A spring has one end seated against the spring support and another end seated against the lip. The spring has a preload force applied thereto urging the top frame away from the bottom frame. Sliding the adjustment plate and the cam towards the spindle causes the cam follower to move upwardly to further compress and add to the preload force on the spring.

In yet another aspect of the invention, a vehicle seat suspension comprises a bottom frame adapted to be mounted on the vehicle, the bottom frame having a pair of spaced front channels secured thereto and a pair of spaced bottom rear channels secured thereto and located rearwardly of the bottom front channels. A top frame is located above the bottom frame and is adapted to supported a seat thereon. Top frame has a pair of spaced top front channels depending therefrom and a pair of spaced adjustment channel assemblies depending therefrom and located rearwardly of the top front channels. Each of the adjustment channel assemblies comprise an adjusting channel formed with a plurality of slots therethrough, a front ear secured to a forward end of the adjusting channel, a rear ear joined to a rear end of the adjusting channel, each of the ears being formed with an opening therethrough, a comb having a multiplicity of teeth, a front tab secured to a forward end of the comb and a rear tab secured to a rear end of the comb, each of the tabs being formed with an aperture therethrough. Each adjusting channel is juxtaposed relative to the comb such that the teeth of the comb are receivable in the slots of the adjusting channel and the openings in the ears are aligned with the apertures in the tabs. Each of the adjustment channel assemblies also comprise a rotatable release rod extending through the aligned openings and the apertures and fixed to the comb, and a torsion spring interposed between the front ear of the adjusting channel and the front tab of the comb and encircling a portion of the release rod so as to normally urge the teeth into engagement with the slots. A connecting wire joins each of the adjustment channel assemblies and transmits rotation of one of the release rods to the other of the release rods. A substantially fully collapsible scissors linkage is interconnected between the top frame and the bottom frame. A biasing arrangement is disposed between the top frame and the bottom frame for urging the top frame away from the bottom frame. The scissors linkage includes a pair of outer links and a pair of inner links, a mid portion of each of the outer links being pivotally connected to a mid portion of the inner links. Each of the outer links and each of the inner links has front ends and rear ends, the front ends of the inner links being connected by a transverse shaft, each end of which carries a first slide block slidably receivable in one of the top front channels on the top frame. The rear ends of the rear links are joined together by a cross shaft, each of which carries a stationary block receivable in one of the bottom rear channels on the bottom frame. The front ends of the outer links each carry a second slide block slidably receivable in one of the bottom front channels on the bottom frame. The rear ends of the outer links are connected by a cross member, each end of which carries an adjusting block slidably receivable in one of the adjustment channel assemblies on the top frame. Each of the adjusting blocks has a bottom surface formed with grooves matable with the teeth on the comb. Selective rotation of the release rod against the bias of the torsion spring moves the teeth on the combs out of engagement with the slots on the adjusting channels and out of engagement with the grooves on the adjusting blocks allowing the latter to slide in the adjusting channels to provide a fore and aft adjustment of the seat on the top frame relative to the bottom frame. The release of the release rod returns the teeth to the slots and the grooves of the adjusting blocks thereby locking the seat in position.

Various other objects, features and advantages of the invention will be made apparent from the following description taken together with the drawings.

BRIEF DESCRIPTION OF THE DRAWINGS

The drawings illustrate the best mode presently contemplated of carrying out the invention. In the drawings:

FIG. 2 is a vertically exploded view of the seat suspension shown in FIG. 1;

FIG. 3 is a vertically exploded view of a first adjustment mechanism forming part of the seat suspension shown in FIG. 2;

FIG. 4 is a top view, in partial cross-section, of the seat suspension of FIG. 2 in assembled form;

FIG. 5 sectional view taken on line 5—5 of FIG. 4;

FIG. 6 is a sectional view similar to FIG. 4 but showing the seat being moved forwardly using the first adjustment mechanism;

FIG. 7 is a sectional view taken on line 7—7 of FIG. 4;

FIG. 8 is a sectional view of the first adjustment mechanism taken on line 8—8 of FIG. 4;

FIG. 9 is a sectional view similar to FIG. 8 but showing portions of the first adjustment mechanism being pivoted downwardly to enable fore and aft movement of the seat;

FIG. 10 is a sectional view taken on line 10—10 of FIG. 4 showing a second adjusment mechanism having a suspension spring assembly adjustable according to the weight of the seat occupant;

FIG. 11 is a sectional view similar to FIG. 10 but showing the second adjusment mechanism movable to a position in which the suspension spring assembly is further compressed;

FIG. 12 is a detail sectional view of an alternative suspension spring assembly used in the second adjustment mechanism of FIGS. 10 and 11.

DETAILED DESCRIPTION OF THE PREFERRED EXEMPLARY EMBODIMENT

Figure 1:
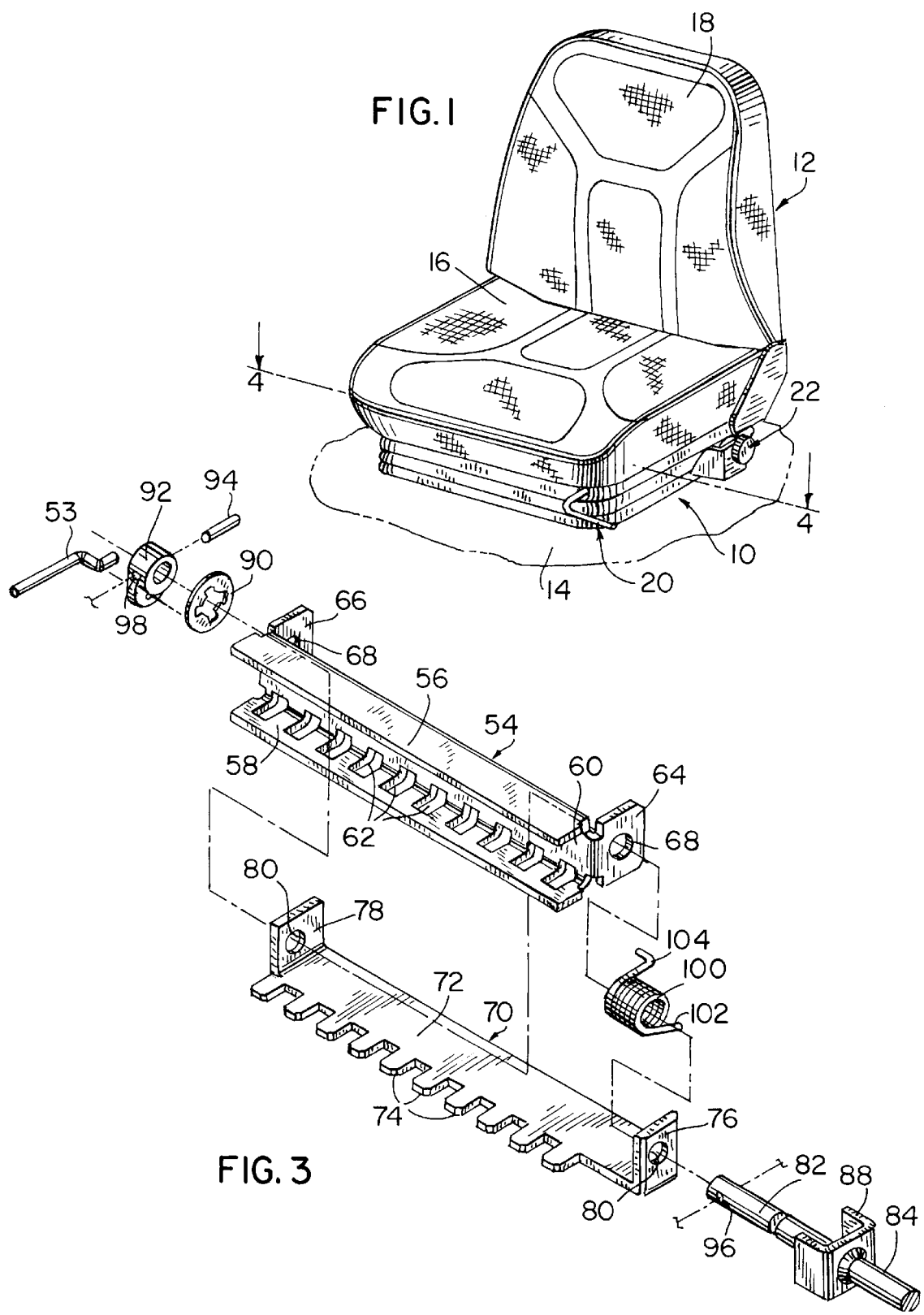
FIG. 1 is a perspective view of a vehicle seat employing the seat suspension embodying the present invention.

Referring now to FIG. 1, a vehicle seat suspension embodying the present invention and generally identified by the reference numeral 10 is shown incorporated into the base or bottom portion of a vehicle seat 12 which is anchored to the floor 14 of the vehicle. As is well known, the vehicle seat 12 includes a seat cushion 16 and a seat back 18 which may either be fixed or pivotably adjustable with respect to the seat cushion 16. According to the invention, a first adjusting mechanism 20 is provided to longitudinally adjust the position of the vehicle seat 12 relative to the floor 14 of the vehicle, while a second adjusting mechanism 22 is provided to alter the resilient suspension of the vehicle seat 12 according to the weight of the seat occupant. The arrangement of the first and second adjusting mechanisms 20, 22 results in the seat having a relatively low profile desirable to the purchasers of such suspensions.

Figure 2:
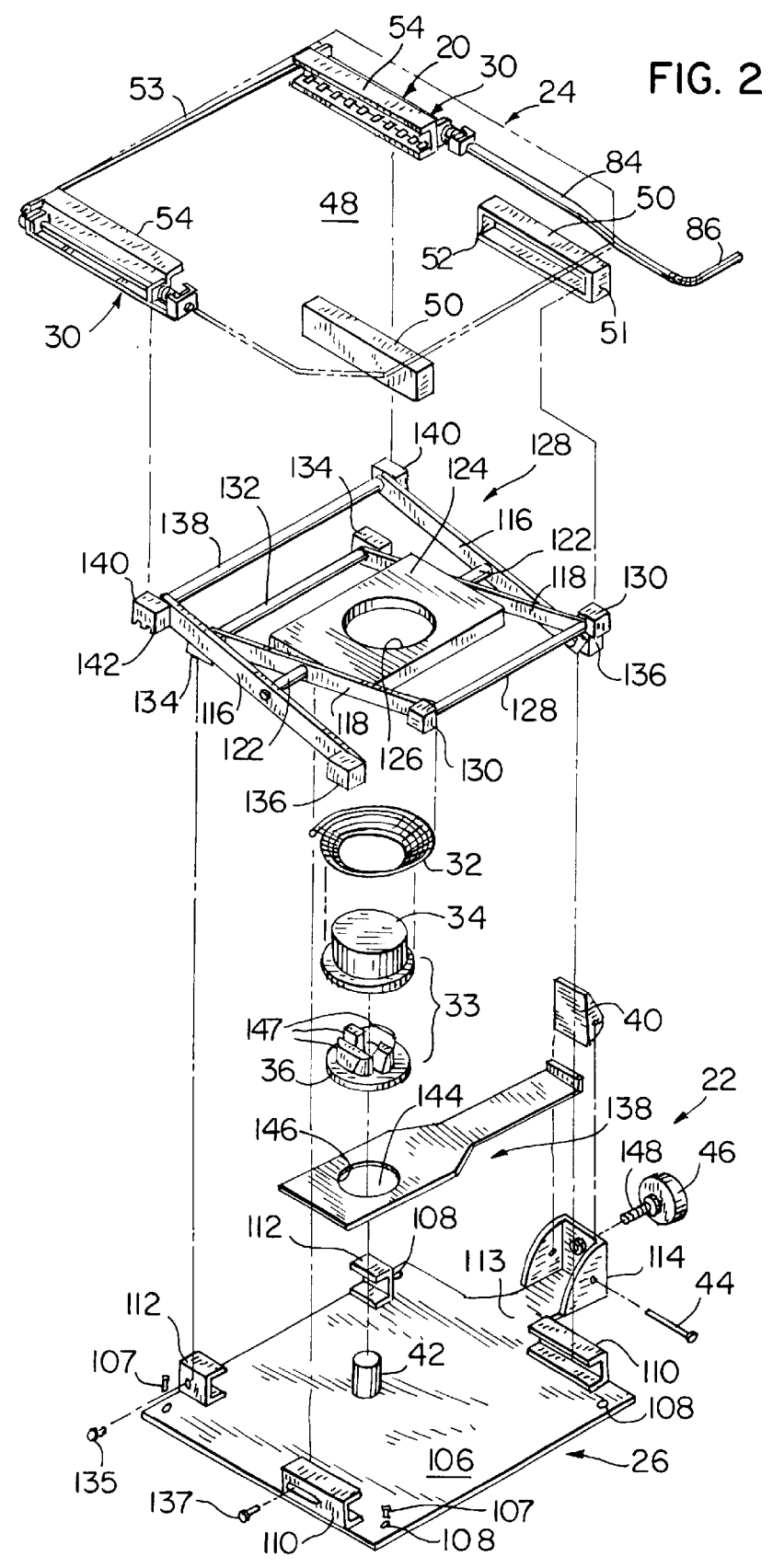

Turning to the exploded, perspective view shown in FIG. 2, the vehicle seat suspension 10 includes a top frame 24, a bottom frame 26, and a substantially fully collapsible scissors linkage 28 interposed between the top and bottom frames 24, 26. The first adjusting mechanism 20 is conveniently isolated in the top frame 24 and comprises a pair of adjustment channel assemblies 30. The second adjusting mechanism 22 is located between the top and bottom frames 24, 26 and comprises a suspension spring 32, a cam assembly 33 defined by a cam follower 34 and a cam 36, an adjustment plate 38, an adjustment lever 40, a cylindrical spindle 42, a pivot pin 44 and a weight adjustment knob 46.

Top frame 24 is a generally rectangular, solid plate 48 preferably fabricated from steel. Plate 48 has an upper surface to which a tubular seat framework 49 (FIG. 4) carrying the vehicle seat 12 is secured such as by welding. Depending from a bottom surface of plate 48 at a forward end thereof is a pair of spaced, inwardly facing top front channels 50. Each of the channels 50 is closed by end walls 51, 52 which define front and rear limits of travel for components of scissors linkage 28 to be described hereafter. Also depending from the bottom surface of plate 48 at a rear end thereof is the pair of spaced adjustment channel assemblies 30 which are operatively tied together by a connecting wire 53.

As seen best in FIG. 3, each adjustment channel assembly 30 comprises an elongated adjusting channel 54 which is U-shaped in cross-section and has an upper wall 56 and a bottom wall 58 connected by a sidewall 60. Bottom wall 58 and a bottom portion of sidewall 60 are formed along their lengths with a series of slots 62. A front ear 64 is secured generally perpendicularly to a forward end of sidewall 60 while a rear ear 66 is similarly joined perpendicularly to a rear end of sidewall 60. Both front ear 64 and rear ear 66 are formed with a circular opening 68 therethrough so that each opening 68 is aligned with the other. A comb 70 which is also U-shaped in cross-section has a bottom wall 72 which is formed with a multiplicity of teeth 74, and interconnects an upwardly extending front tab 76 at a forward end of comb 70 with an upwardly extending rear tab 78 at a rear end of comb 70. Both front tab 76 and rear tab 78 are provided with a circular aperture 80 therethrough so that each aperture 80 is aligned with the other. Referring to FIGS. 2, 4, 8 and 9, adjusting channel 54 is juxtaposed relative to comb 70 such that the teeth 74 of comb 70 are receivable in slots 62 of adjusting channel 54, and the openings 68 in front and rear ears 64, 66 are aligned with apertures 80 in front and rear tabs 76, 78. On each adjustment channel assembly 30, an elongated release rod 82 extends through the aligned openings 68 and apertures 80. The release rod 82 on the left side of the vehicle seat 12 includes an extension 84 which runs beyond the front end of the seat and terminates in a curved or bent handle 86 accessible to the seat occupant outside the left front corner of the seat. The forward end of each release rod 82 includes a U-shaped turning channel 88 fixed thereto which abuts front tab 76 on comb 70. The rear end of each release rod 82 projects beyond rear tab 66, passes through a retaining ring 90 and is received in a wire eye 92 where it is secured by means of a spring pin 94 inserted in aligned transverse holes 96, 98 in wire eye 92 and release rod 82, respectively. In order to maintain the desired relationship between adjusting channel 54 and comb 70, a torsion latch spring 100 surrounds a portion of each release rod 82 and is interposed between front ear 64 of adjusting channel 54 and front tab 76 of comb 70 (FIG. 4). Each torsion latch spring 100 has one end 102 biased against bottom wall 72 of comb 70 and another end 104 biased against top plate 48. With this arrangement, each spring 100 functions to normally retain the teeth 74 of each comb 70 in the slots 62 of its respective adjusting channel 54.

Referring back to FIG. 2, bottom frame 26 is a generally rectangular, solid plate 106 preferably constituted of steel which is adapted to be fastened by bolts 107 passing through holes 108 formed in the periphery thereof. Alternatively, studs extending upwardly from the floor of the vehicle pass through holes 108 and can be secured by nuts (not shown). Plate 106 has an upper surface upon a forward end of which a pair of spaced, inwardly facing, bottom front channels 110 are secured, and upon a rear end of which a pair of spaced, inwardly facing bottom rear channels 112 are mounted. Bottom frame 26 includes a neck portion 113 to which an upstanding, three-sided adjustment bracket 114 is attached.

Top frame 24 and bottom frame 26 are connected one above the other in parallel by scissors linkage 28 formed by a pair of outer links 116 and a pair of inner links 118. The mid portion of each outer link 116 is pivotally connected to a mid portion of each inner link 118 by a pivot pin 120 which is shielded by an outer sleeve 122 best depicted in FIGS. 10 and 11. The inner end of each pivot pin 120 is mounted for rotation to a side of a generally rectangular support platform 124 having a central opening 126 formed therein. The front ends of inner links 118 are interconnected by a transverse shaft 128, each end of which carries a first slide block 130 slidably receivable in a respective one of the top front channels 50 on top frame 24. The rear ends of inner links 118 are joined together by a cross shaft 132, each end of which carries a stationary block 134 receivable and fixed by fastener 135 in a respective one of the bottom rear channels 112 on bottom frame 26. The front ends of outer links 116 each carry a second slide block 136 slidably receivable and connected by fastener 137 in a respective one of the bottom front channels 110 on bottom frame 26. The rear ends of outer links 116 are connected by a cross member 138, each end of which carries an adjusting block 140 slidably receivable in a respective one of the adjustment channel assemblies 30 on top frame 24. Each of adjusting blocks 140 has a bottom surface formed with grooves 142 which are capable of mating with teeth 74 on each comb 70.

As a salient feature of the invention, inner and outer links 116, 118 are spaced from each other such that first slide blocks 130 lie substantially inwardly of and almost at the same level as secondary slide blocks 136 (FIG. 13) when scissors linkage 28 is generally fully collapsed. In such fully collapsed position, it should be understood that stationary blocks 134 also lie inwardly of and at nearly the same level as adjusting blocks 140, and that spring 32 is further compressed so that its coils will be tightly bunched upon one another. As seen in FIG. 4, inner links 118, cross/shaft 132, and blocks 134 lie inwardly of outer links 116, cross member 138 and blocks 140, blocks 134 being spaced forwardly of blocks 140. The distance of inner link 118 between pivot 122 and cross shaft 132 and the distance of outer link 116 between pivot 122 and cross member 138 are particularly proportioned so that the scissors linkage is substantially fully collapsible. By arranging the links and spring in this fashion, additional clearance is obtained which places the seat at a particularly low profile. This is contrasted by the prior art scissors linkages in which scissors components fell on top of one another increasing the height at which the seat is positioned relative to the floor of the vehicle.

As illustrated in FIGS. 2, 10 and 11, cylindrical spindle 42 extends vertically upwardly from bottom frame 26 and passes through a circular opening 144 formed by a continuous wall 146 on a distal end of adjustment plate 38 overlying bottom plate 106. The diameter of opening 144 is larger than the diameter of spindle 42 so that spindle 42 lies in spaced relationship with wall 146. The proximal end of adjustment plate 38 is disposed in adjustment bracket 114 and is joined to the bottom of adjustment lever 40 which in turn is pivotally mounted on pivot pin 44 and adjustment bracket 38. Adjustment knob 46 has a shaft 148 screw threaded into adjustment bracket 38 and is manipulable against adjustment lever 40 to selectively slide the adjustment plate 38 back and forth on bottom plate 106 over a limited distance defined by the clearance between spindle 42 and opening 144. Disposed over spindle 42 and fixed to adjustment plate 38 is cam 36 which includes a series of inclined wedges or ramps 147 engageable with complementary ramped surfaces 149 on overlying cam follower 34. Extending outwardly from the base of cam follower 34 is a lip 150 which serves to seat a small or lower end of spring 32 which encircles cam follower 34 and terminates in a large or upper end of spring 32 being seated against support platform 124. Spring 32 is installed with a predetermined preload force which urges the top frame 24 away from bottom frame 26 and prevents top frame 24 from collapsing on bottom frame 26. In the preferred embodiment, spring 32 is preferably a single, conical compression spring having a metallic constitution. However, the invention also contemplates the use of multiple, cooperating plastic springs 32' such as constructed from Delrin, as illustrated in FIG. 12.

In use, let us assume it is desired to change the longitudinal or fore and aft position of seat 12 from a rearmost portion shown in FIG. 5 to a forwardmost position shown in FIG. 6 in which each adjusting block 130 abuts forward end wall 51 of each channel 50, and each slide block 140 is accordingly positioned at the forward end of each adjusting channel 54. One simply grasps handle 86 and, against the bias of spring 100 lifts and rotates the extension 84 and release rod 82 on the left side of the seat 12 which rotational motion is transferred to the right side of seat 12 by means of connecting wire 53 shown in FIG. 7. Such rotation will move the teeth 74 on combs 70 out of engagement with the slots 62 on adjusting channels 54, and out of engagement with the grooves 142 on adjusting blocks 140 allowing the latter to slide rearwardly in the adjusting channels 54, in this case, until each adjusting block 130 abuts the rear end 52 of each channel 50 and each slide block 140 is accordingly positioned at the rear end of each adjusting channel 54. Once the desired slide position is reached, handle 86 is released and latch spring 100 will rotate and return each release rod 82 such that teeth 74 will again engage slots 62 and grooves 142 thereby locking seat 12 in position.

Figure 13:
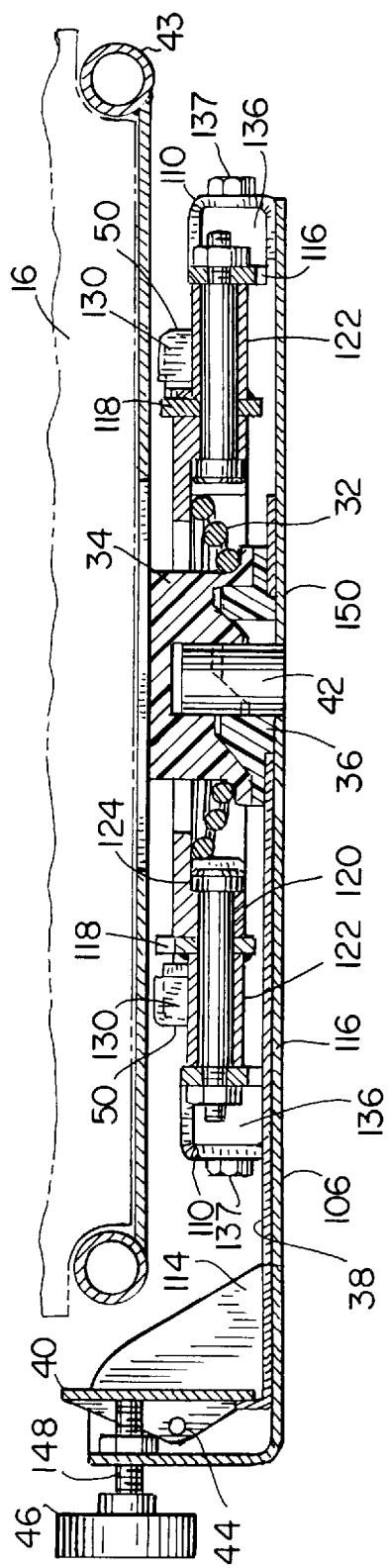
FIG. 13 is a sectional view similar to FIGS. 10 and 11 but showing the scissors linkage of the seat suspension in a substantially fully collapsible position.

If it is desired to change the preload force on the suspension spring 32 from its lower setting shown in FIG. 10 to a higher setting shown in FIG. 11 as dictated by the weight of the seat occupant, one conveniently turns the adjustment knob 46 outside left side of seat 12 which causes adjustment lever 40 to pivot on pivot pin 44 and slide adjustment plate 38 to the left on bottom plate 106. Movement of adjustment plate 38 also pulls cam 36 to the left and causes ramp surfaces 149 on cam follower 34 to move upwardly along the ramps 147 on cam 36. Cam follower 34 is also guided upwardly by spindle 42 owing to the passageway 152 formed therein. Depending on its size, cam follower 34 may travel upwardly into opening 126 on support platform 124. Due to the upward movement of cam follower 34, suspension spring 32 is further compressed thereby increasing the preload force which results in a stiffer ride. When suspension spring 32 is fully compressed, the coils of the spring 32 are tightly bunched together, as shown in FIG. 13, and scissors linkage 28 is substantially fully collapsed, thereby creating an extremely favorable low profile. In the preferred embodiment, the vertical suspension stroke afforded by the elements used is approximately 1.75 inches which creates a suitable margin of comfort for most seat occupants. However, it should be appreciated that the suspension may be otherwise tailored such as by employing different size cam members or using different and/or multiple springs such as the plastic springs 32' shown in FIG. 12.

It should be understood that the present invention provides a seat suspension having both fore and aft adjustment and weight compensation adjustment constructed and arranged in a manner which will produce a low profile seat meeting the dimensional tolerances of seat purchasers. Unlike prior art devices employing overly complicated arrangements having multiple springs, levers, pawls, bell cranks, cam tracks and the like, the present invention comprises a minimal of parts which improve its operability and maintenance and reduce its weight and cost.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

We claim:

1. An adjustable vehicle seat comprising:
   a bottom frame adapted to be mounted on the vehicle;
   a top frame located above said bottom frame and adapted to support a seat thereon;
   a scissors linkage interconnecting said bottom frame and said top frame and constraining said top frame to vertical movement relative to said bottom frame, said linkage including a spring support;
   a spindle mounted on and extending upwardly from said bottom frame;
   an adjustment plate slidably disposed on said bottom frame, said adjustment plate having a continuous wall forming an opening through which said spindle projects in spaced relationship to said wall;
   a cam fixed to said adjustment plate and encircling said spindle in spaced relationship therewith;
   a cam follower movably mounted upon said cam and encircling said spindle, said cam follower having a lip extending outwardly therefrom; and
   a spring having one end seated against said spring support and another end seated against said lip, said spring having a preload force applied thereto urging said top frame away from said bottom frame;
   wherein sliding said adjustment plate and said cam towards said spindle causes said cam follower to move upwardly to further compress and add to said preload force on said spring.

2. The adjustable seat of claim 1, wherein said adjustable plate includes an adjustment lever which is pivotally mounted to said bottom frame and is engageable with an adjustment screw threaded into said bottom plate.

3. The adjustable seat of claim 1, wherein said cam includes a series of inclined ramps.

4. The adjustable seat of claim 1, wherein said cam follower includes a series of inclined, ramped surfaces engaged with said ramps.

5. The adjustable seat of claim 1, wherein said cam follower is movably guidable upwardly and downwardly along said spindle.

6. The adjustable seat of claim 1, wherein said spring comprises a conical compression spring.

7. The adjustable seat of claim 1, wherein said spring comprises a pair of cooperating plastic springs.

* * * * *